Patented Jan. 26, 1937

2,069,158

UNITED STATES PATENT OFFICE 2,069,158

DISAZO-DYESTUFFS INSOLUBLE IN WATER AND FIBER DYED THEREWITH

Karl Schnitzspahn, Offenbach-on-the-Main, and Paul Jörg, Frankfort-on-the-Main-Hochst, Germany, assignors to General Aniline Works, Inc., New York, N. Y., a corporation of Delaware No Drawing. Application May 2, 1936, Serial No. 77,638. In Germany May 10, 1935

8 Claims. (Cl. 260—84)

The present invention relates to disazo-dyestuffs insoluble in water and to fiber dyed therewith; more particularly, it relates to compounds of the following general formula:

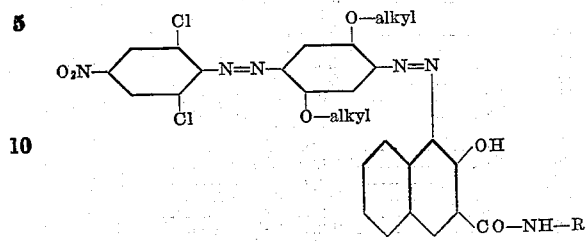

wherein R stands for a radical of the benzene or naphthalene series.

We have found that valuable disazo-dyestuffs insoluble in water are obtainable by diazotizing an amino-azo-compound of the following formula:

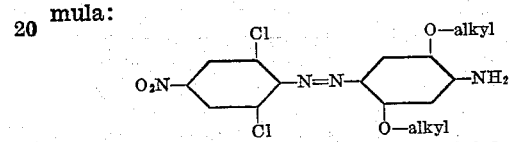

and combining it with an arylide of 2,3-hydroxynaphthoic acid. The amino-azo-compounds may be obtained by coupling diazotized 1-amino-2,6-dichloro-4-nitro-benzene with amino-hydroquinone-dialkyl ethers. The new dyestuffs, when produced in substance, are valuable blue-black to black pigments. They are also especially suitable for the manufacture of water-insoluble dyestuffs on the fiber, by the ice-color method or by one of the known printing processes, for instance, by the direct printing method.

The blue-black to black dyestuffs thus obtained are distinguished by their good properties of fastness. They surpass with respect to fastness to light the known black dyestuffs obtainable from diazotized amino-azo-compounds and arylides of 2,3-hydroxynaphthoic acid, for instance, by the processes of German Patents Nos. 293,375, 383,903, 391,091 and 392,077. They, therefore, represent a valuable enrichment of the classes of pigments and ice-colors.

The following examples serve to illustrate the invention, but they are not intended to limit it thereto;

For producing the dyeings 50 grams of cotton yarn are grounded in the grounding liquor for half-an-hour, squeezed and developed for half-an-hour in the diazo-solution. The material is then rinsed, soaped at boiling temperature, rinsed and dried.

1. (a) *Grounding liquor*

5 grams of 2,3-hydroxynaphthoylaminobenzene are dissolved in a mixture of 10 cc. of alcohol, 2.5 cc. of formaldehyde of 30 per cent. strength, 2.5 cc. of caustic soda solution of 34° Bé. and 10 cc. of water and the solution is added to 1 liter of water of 35° C., in which 10 cc. of Turkey red oil of 50 per cent. strength and 12 cc. of caustic soda solution of 34° Bé. have been dissolved.

(b) *Diazo-solution*

3.7 grams of the amino-compound of the following constitution:

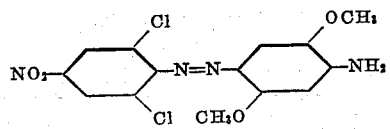

are made into a paste with 5 cc. of formic acid of 90 per cent. strength and stirred together with 3.2 cc. of sulfuric acid of 36° Bé. A solution of 0.8 gram of sodium nitrite is run into this mixture while cooling with ice. After about 20 minutes the diazotization is finished. The bath is made up to 1 liter and neutralized with 4 grams of crystallized sodium acetate. Blue-black tints of good fastness to light are obtained.

The dyestuff has the following formula:

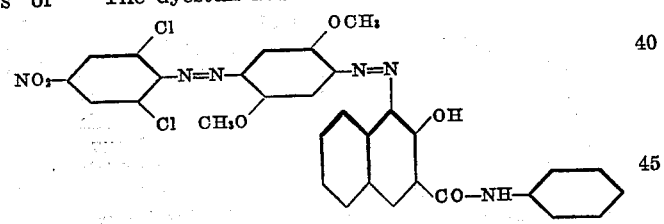

2. (a) *Grounding liquor*

1.4 grams of 2-(2',3'-hydroxynaphthoylamino)-naphthalene are dissolved in a mixture of 3 cc. of alcohol, 0.7 cc. of formaldehyde of 30 per cent. strength, 0.7 cc. of caustic soda solution of 34° Bé. and 3 cc. of water and the whole is then added to 1 liter of water of 35° C. containing 10 cc. of Turkey red oil of 50 per cent. strength and 12 cc. of caustic soda solution of 34° Bé.

(b) *Diazo-solution:*

4 grams of the amino-azo-compound of the following constitution:

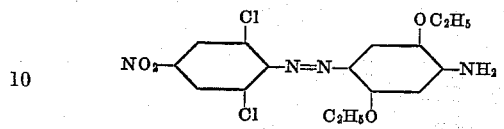

are made into a paste with 5 cc. of formic acid of 90 per cent. strength and stirred together with 3.2 cc. of sulfuric acid of 36° Bé. A solution of 0.8 gram of sodium nitrite is run into this mixture while cooling with ice. After about 20 minutes the bath is made up to 1 liter and neutralized with 4 grams of crystallized sodium acetate.

Blue-black dyeings of good fastness to light are obtained.

3. *Diazo-printing color*

80 grams of dry diazo-salt containing 20 per cent. by weight of the base of the following formula:

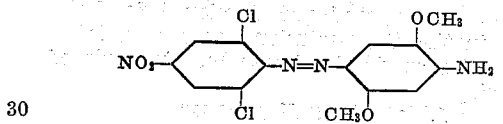

in the form of the zinc chloride double salt of the diazonium chloride, are stirred with water with addition of 90 cc. of acetic acid of 50 per cent. strength, and 400 grams of wheat starch-tragacanth thickening are added. The whole is made up to 1 kilo.

*Grounding liquor*

15 grams of 1-(2',3'-hydroxynaphthoylamino)-2-methyl-benzene, 20 grams of Monopol brilliant oil, 18 cc. of caustic soda solution of 38° Bé. are dissolved with water and made up to 1 liter in the usual manner.

*Printing prescription*

The dye goods are padded with the grounding liquor, dried, printed with the diazo-printing color, dried again and then treated with hot, dilute sodium carbonate solution. The material is then rinsed, soaped at boiling temperature, rinsed again and dried.

Blue-black prints of good fastness to light are obtained.

4. 37.1 grams of the amino-azo-body of the formula:

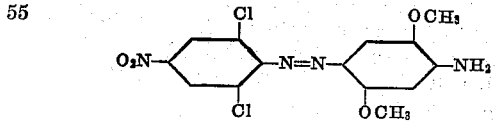

are diazotized in the usual manner with dilute sulfuric acid and sodium nitrite. The clear diazo-solution which has been filtered with suction is run into a solution, rendered alkaline with caustic soda, of 29.3 grams of 1-(2',3'-hydroxynaphthoylamino)-2-methoxybenzene, and which contains such a quantity of caustic soda solution as is necessary to maintain a caustic alkaline reaction until the coupling operation is finished. When the coupling operation is finished the dyestuff obtained is filtered with suction and washed until neutral. In the dry state it is a blue black powder of good fastness to light.

By using other arylides of 2,3-hydroxynaphthoic acid dyestuffs of similar properties are obtained. The following table indicates a number of further azo-dyestuffs, obtainable according to the present invention:

| Diazo-component: | Coupling component: 1-(2', 3'-hydroxynaphthoylamino)- | Tint: |
|---|---|---|
| (1) 4-amino-2, 5-dimethoxy-2', 6' - dichloro - 4' - nitroazobenzene. | 3-chloro-4, 6-dimethoxybenzene. | Black-blue |
| (2) Do | 2-methyl-4-methoxybenzene. | Black-blue |
| (3) Do | 2, 5-dimethoxybenzene | Blue-black |
| (4) Do | 4-methoxybenzene | Blue-black |
| (5) Do | 2 - methyl - 4 - chlorobenzene. | Blue-black |
| (6) Do | Naphthalene | Blue-black |
| (7) Do | 3-nitrobenzene | Black |
| (8) Do | 4-chlorobenzene | Blue-black |
| (9) Do | 3-chloro-4, 6-dimethoxybenzene. | Black-blue |
| (10) Do | 2-methyl-4-methoxybenzene. | Black-blue |
| (11) Do | 2, 5-dimethoxybenzene | Black-blue |
| (12) Do | 2-methoxybenzene | Blue-black |
| (13) Do | 4-methoxybenzene | Blue-black |
| (14) Do | 2 - methyl - 4 - chlorobenzene. | Blue-black |
| (15) Do | Naphthalene | Black-blue |
| (16) Do | 2-methylbenzene | Black-blue |
| (17) Do | Benzene | Blue-black |
| (18) Do | 3-nitrobenzene | Black |
| (19) Do | 4-chlorobenzene | Blue-black |
| (20) Do | 2-(2', 3'-hydroxynaphthoylamino) - naphthalene. | Blue-black |

Since an object of the present invention is to provide dyestuffs of good fastness properties which dyestuffs are insoluble in water and alkalies, it is to be understood that the aromatic nuclei of the general formula appearing in the appended claims do not contain any substituents which are known to render organic compounds soluble in water or alkalies and to tend to depreciate the fastness of the dyestuffs to alkalies. Substituents of this kind are, for instance, the sulfonic acid and the carboxylic acid group.

We claim:

1. The water-insoluble disazo-dyestuffs of the following general formula:

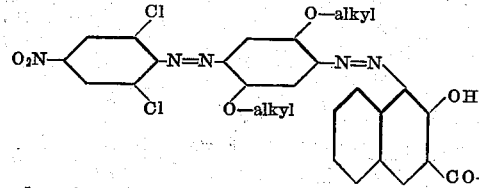

wherein R stands for a radical selected from the group consisting of the radicals of the benzene and naphthalene series, being blue-black to black powders and yielding, when produced on the fiber, blue-black to black dyeings of good fastness properties, particularly of very good fastness to light.

2. The water-insoluble disazo-dyestuff of the following formula:

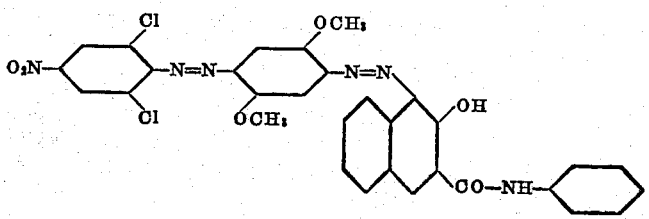

being a blue-black powder and yielding, when produced on the fiber, blue-black dyeings of good fastness properties, particularly of very good fastness to light.

3. The water-insoluble disazo-dyestuff of the following formula:

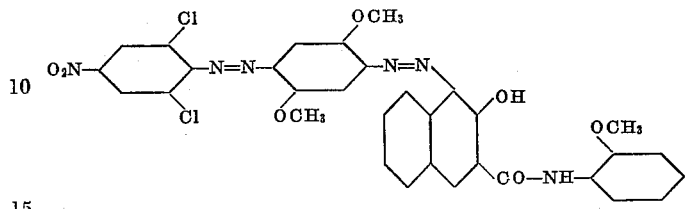

being a blue-black powder and yielding, when produced on the fiber, blue-black dyeings of good fastness properties, particularly of very good fastness to light.

4. The water-insoluble disazo-dyestuff of the following formula:

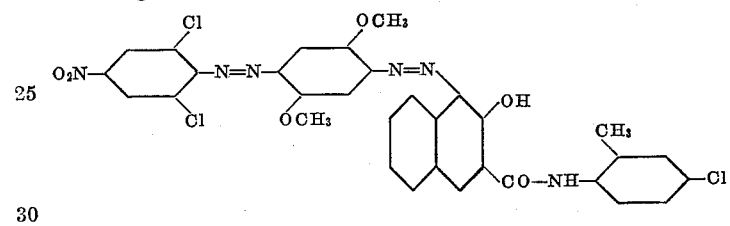

being a blue-black powder and yielding, when produced on the fiber, blue-black dyeings of good fastness properties, particularly of very good fastness to light.

5. Fiber dyed with the water-insoluble disazo-dyestuffs as claimed in claim 1.

6. Fiber dyed with the water-insoluble disazo-dyestuff as claimed in claim 2.

7. Fiber dyed with the water-insoluble disazo-dyestuff as claimed in claim 3.

8. Fiber dyed with the water-insoluble disazo-dyestuff as claimed in claim 4.

KARL SCHNITZSPAHN.
PAUL JÖRG.